United States Patent
Sugi et al.

(10) Patent No.: US 8,879,201 B2
(45) Date of Patent: Nov. 4, 2014

(54) SPINDLE MOTOR, AND DISK DRIVE APPARATUS INCLUDING THE SPINDLE MOTOR

(71) Applicant: Nidec Corporation, Kyoto (JP)

(72) Inventors: Takatoki Sugi, Kyoto (JP); Tomohiro Yoneda, Kyoto (JP); Hiroshi Kobayashi, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 13/947,138

(22) Filed: Jul. 22, 2013

(65) Prior Publication Data
US 2013/0308225 A1 Nov. 21, 2013

Related U.S. Application Data

(62) Division of application No. 13/334,620, filed on Dec. 22, 2011, now Pat. No. 8,593,756.

(30) Foreign Application Priority Data

Dec. 27, 2010 (JP) .................................. 2010-289546
Nov. 2, 2011 (JP) .................................. 2011-240741

(51) Int. Cl.
| | | |
|---|---|---|
| *G11B 17/08* | (2006.01) | |
| *H02K 15/14* | (2006.01) | |
| *G11B 19/20* | (2006.01) | |
| *H02K 5/04* | (2006.01) | |
| *F16C 33/74* | (2006.01) | |
| *G11B 33/08* | (2006.01) | |
| *H02K 5/167* | (2006.01) | |
| *F16C 41/00* | (2006.01) | |
| *H02K 5/16* | (2006.01) | |

(52) U.S. Cl.
CPC ................ *G11B 33/08* (2013.01); *H02K 15/14* (2013.01); *G11B 19/2009* (2013.01); *H02K 5/04* (2013.01); *F16C 33/743* (2013.01); *H02K 5/1677* (2013.01); *F16C 41/008* (2013.01); *H02K 5/16* (2013.01)
USPC ........................................ 360/98.07; 384/115

(58) Field of Classification Search
USPC .............. 310/90, 216.116, 216.121, 216.123; 360/98.07, 99.04, 99.08; 384/114–120, 384/322
See application file for complete search history.

(56) References Cited

U.S. PATENT DOCUMENTS

| 5,373,407 A | 12/1994 | Stupak, Jr. et al. |
| 7,684,146 B1 * | 3/2010 | Andrikowich et al. .... 360/99.21 |

(Continued)

FOREIGN PATENT DOCUMENTS

CN 101263310 A 9/2008

OTHER PUBLICATIONS

Sugi et al., "Spindle Motor, and Disk Drive Apparatus Including the Spindle Motor," U.S. Appl. No. 13/947,136, filed Jul. 22, 2013.

(Continued)

*Primary Examiner* — Adam B Dravininkas
(74) *Attorney, Agent, or Firm* — Keating & Bennett, LLP

(57) ABSTRACT

A spindle motor includes a shaft arranged to extend in an axial direction, and a base portion arranged to define a portion of a housing, and including a through hole in which the shaft is inserted. A fixing region is defined between an inner circumferential portion of the base portion and a lower portion of the shaft. The fixing region includes a press-fitting region and an adhesion region defined on a lower side of the press-fitting region and in which a seal gap is defined between the inner circumferential portion of the base portion and the lower portion of the shaft. The seal gap is arranged to gradually decrease in radial width with increasing height. The seal gap is arranged to include an adhesive arranged therein over an entire circumference thereof.

10 Claims, 17 Drawing Sheets

(56) References Cited

U.S. PATENT DOCUMENTS

| | | | |
|---|---|---|---|
| 2002/0084704 A1* | 7/2002 | Fukutani et al. | 310/67 R |
| 2004/0145260 A1* | 7/2004 | Tamaoka et al. | 310/90 |
| 2009/0103840 A1 | 4/2009 | Hibi et al. | |
| 2010/0181875 A1* | 7/2010 | Tamaoka et al. | 310/425 |
| 2010/0195250 A1* | 8/2010 | Sekii et al. | 360/234.1 |
| 2010/0202080 A1* | 8/2010 | Iguchi et al. | 360/55 |
| 2011/0170813 A1* | 7/2011 | Hori | 384/114 |

OTHER PUBLICATIONS

Sugi et al., "Spindle Motor, and Disk Drive Apparatus Including the Spindle Motor," U.S. Appl. No. 13/947,139, filed Jul. 22, 2013.

Sugi et al., "Spindle Motor, and Disk Drive Apparatus Including the Spindle Motor", U.S. Appl. No. 13/334,620, filed Dec. 22, 2011.

* cited by examiner

A – A

SPINDLE MOTOR, AND DISK DRIVE APPARATUS INCLUDING THE SPINDLE MOTOR

BACKGROUND OF THE INVENTION

1. Field of the Invention

The present invention relates to a spindle motor and more specifically to a spindle motor for use in a disk drive apparatus.

2. Description of the Related Art

In recent years, in accordance with increased storage density of disks, there has been a demand for disk drive apparatuses, such as hard disk drives, to control rotation of the disks, movement of heads, and so on with high precision. In a known hard disk drive (HDD) disclosed in JP-A 2006-40423, a gas arranged in an interior of the HDD is a low-density gas, such as a helium gas or a hydrogen gas, and the HDD is thereby arranged to achieve a reduction in resistance of the gas against a disk, a head, and so on during rotation of a spindle motor. The reduction in the resistance of the gas against the disk, the head, and so on contributes to reducing vibration of the disk, the head, and so on, enabling highly precise data recording.

Bases of some spindle motors (hereinafter referred to simply as "motors") installed in HDDs are defined by portions of housings of the HDDs. In the case where the interior of the HDD is filled with a gas such as a helium gas or the like as described in JP-A 2006-40423, the helium gas, for example, which has extremely small molecules, tends to easily leak out of the interior of the HDD to an outside of the HDD. Therefore, in the case where a shaft is fixed in a through hole defined in the base, it is not easy to ensure sufficient sealing of a region in which the base and the shaft are fixed to each other.

SUMMARY OF THE INVENTION

A spindle motor according to a preferred embodiment of the present invention preferably is used in a disk drive apparatus including a housing defining an interior space. The spindle motor includes a stationary portion, a base portion, and a rotating portion. The stationary portion preferably includes a shaft arranged to extend in an axial direction. The base portion is preferably arranged to define a portion of the housing and includes a through hole in which the shaft is inserted. The rotating portion is arranged to rotate about a central axis with respect to the stationary portion.

The base portion preferably includes an inner circumferential portion arranged to define the through hole. The inner circumferential portion and a lower portion of the shaft define a fixing region therebetween. The fixing region preferably includes a press-fitting region and an adhesion region defined on a lower side of the press-fitting region. In the adhesion region, a seal gap is preferably defined between the inner circumferential portion of the base portion and the lower portion of the shaft.

The seal gap is preferably arranged to gradually decrease in radial width with increasing height. In addition, the seal gap is arranged to include an adhesive arranged therein over an entire circumference thereof.

A spindle motor according to another preferred embodiment of the present invention is preferably used in a disk drive apparatus including a housing defining an interior space. The spindle motor includes a stationary portion, a base portion, and a rotating portion. The stationary portion preferably includes a shaft arranged to extend in an axial direction. The base portion is preferably arranged to define a portion of the housing and includes a through hole in which the shaft is inserted. The rotating portion is arranged to rotate about a central axis with respect to the stationary portion.

The base portion includes an inner circumferential portion arranged to define the through hole. The inner circumferential portion and a lower portion of the shaft define a fixing region therebetween. The fixing region preferably includes a press-fitting region and an adhesion region defined on a lower side of the press-fitting region. In the adhesion region, a seal gap is defined between the inner circumferential portion of the base portion and the lower portion of the shaft.

One of the lower portion of the shaft and a lower end portion of an inner circumferential surface of the inner circumferential portion of the base portion preferably includes a recessed portion arranged to be in connection with the seal gap. The seal gap and a space in the through hole abutting on the recessed portion are preferably arranged to include an adhesive arranged continuously therein, with the adhesive being arranged over an entire circumference of the seal gap.

A spindle motor according to yet another preferred embodiment of the present invention is preferably used in a disk drive apparatus including a housing defining an interior space. The spindle motor includes a stationary portion, a base portion, and a rotating portion. The stationary portion preferably includes a shaft arranged to extend in an axial direction. The base portion is preferably arranged to define a portion of the housing, and includes a through hole in which the shaft is inserted. The rotating portion is arranged to rotate about a central axis with respect to the stationary portion.

The base portion preferably includes an inner circumferential portion arranged to define the through hole. The inner circumferential portion and a lower portion of the shaft define a fixing region therebetween. The fixing region includes a press-fitting region and an adhesion region defined on a lower side of the press-fitting region. In the adhesion region, a seal gap is preferably defined between the inner circumferential portion of the base portion and the lower portion of the shaft.

The seal gap is arranged to include an adhesive arranged therein over an entire circumference thereof. An increased-width gap portion is preferably defined at a boundary between the seal gap and the press-fitting region or in a portion of the seal gap which is in a vicinity of the press-fitting region. The increased-width gap portion has an increased radial width and extends over an entire circumference.

A communicating channel is defined within the base portion or between the lower portion of the shaft and the inner circumferential portion of the base portion to connect the increased-width gap portion with a space defined on an upper side of an upper surface of the base portion.

A spindle motor according to yet another preferred embodiment of the present invention is preferably used in a disk drive apparatus including a housing defining an interior space. The spindle motor includes a stationary portion, a base portion, and a rotating portion. The stationary portion preferably includes a shaft arranged to extend in an axial direction. The base portion is preferably arranged to define a portion of the housing and includes a through hole in which the shaft is inserted. The rotating portion is arranged to rotate about a central axis with respect to the stationary portion through a bearing mechanism.

The shaft preferably includes a non-through hole portion, a first connection channel, and a second connection channel. The non-through hole portion is arranged to extend downward from an upper end of the shaft. The first connection channel is arranged to extend from the hole portion in a radial direction to connect the hole portion with an interior of the bearing mechanism. The second connection channel is arranged to extend from the hole portion in the radial direction to connect the hole portion with a space defined on a lower side of the bearing mechanism.

Various preferred embodiments of the present invention are able to prevent a gas arranged in an interior of a housing from leaking out of the housing.

Also, various preferred embodiments of the present invention are arranged to achieve an improvement in perpendicularity of the upper end surface of the thrust portion with respect to the outside surface of the shaft.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
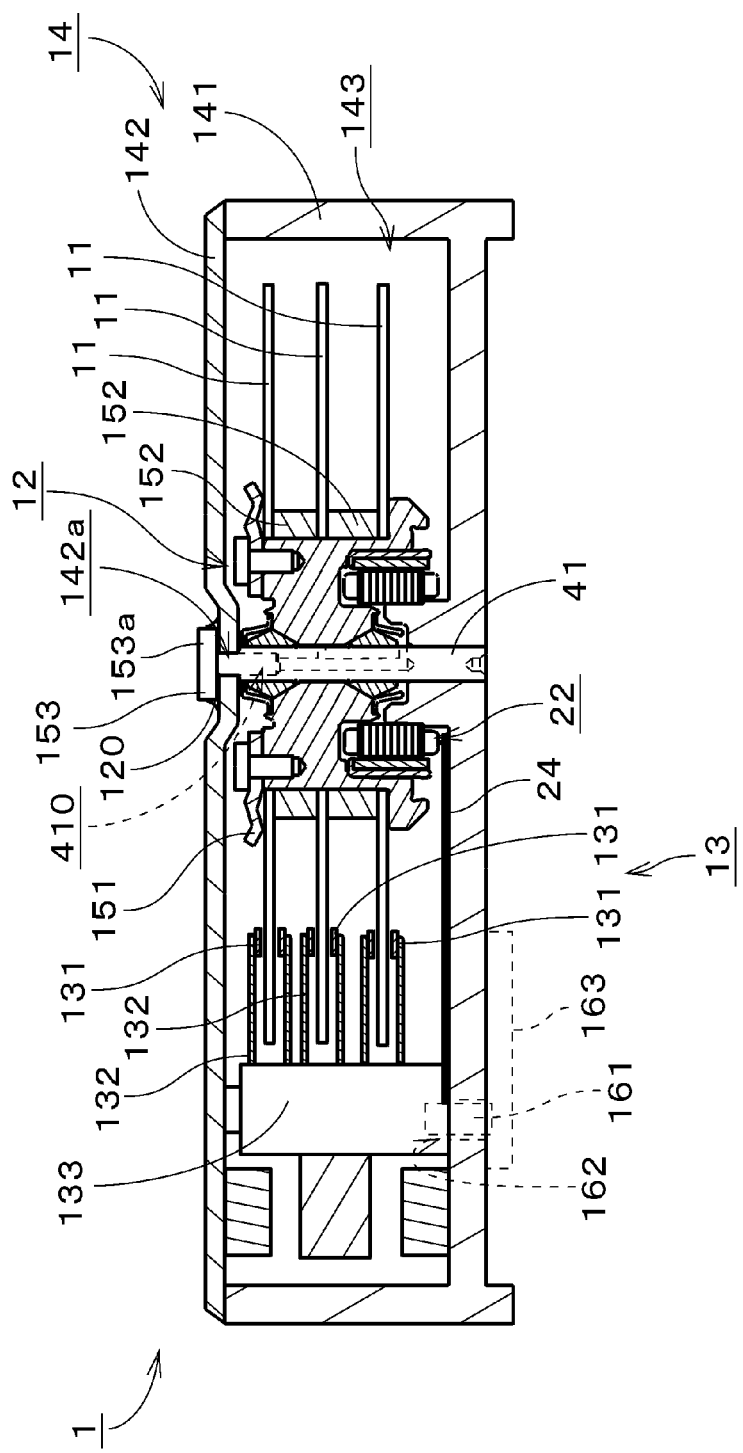
FIG. 1 is a diagram illustrating a disk drive apparatus according to a first preferred embodiment of the present invention.

It is assumed herein that a vertical direction is defined as a direction in which a central axis of a motor extends, and that an upper side and a lower side along the central axis in FIG. 1 are referred to simply as an upper side and a lower side, respectively. It should be noted, however, that the above definitions of the vertical direction and the upper and lower sides should not be construed to restrict relative positions or directions of different members or portions when the motor is actually installed in a device. Also note that a direction parallel or substantially parallel to the central axis is referred to by the term "axial direction", "axial", or "axially", that radial directions centered on the central axis are simply referred to by the term "radial direction", "radial", or "radially", and that a circumferential direction about the central axis is simply referred to by the term "circumferential direction", "circumferential", or "circumferentially".

FIG. 1 is a vertical cross-sectional view of a disk drive apparatus 1 including a spindle motor (hereinafter referred to simply as a "motor") 12 according to a first preferred embodiment of the present invention. The disk drive apparatus 1 is a so-called hard disk drive. The disk drive apparatus 1 preferably includes, for example, three disc-shaped disks 11, on which information is recorded, the motor 12, an access portion 13, a clamper 151, and a housing 14. The motor 12 is arranged to rotate while holding the disks 11. The access portion 13 is arranged to perform at least one of reading and writing of information from or to the disks 11. Note that the number of disks 11 may be other than three if so desired. Also note that the access portion 13 may be arranged to perform both the reading and the writing of information from or to the disks 11.

The housing 14 preferably includes a first housing member 141 and a second housing member 142, the second housing member 142 preferably having the shape of a flat plate. The disks 11, the motor 12, the access portion 13, and the clamper 151 are contained in the housing 14. The first housing member 141 and the second housing member 142 are preferably joined to each other through, for example, welding or by any other suitable methods to define the housing 14 of the disk drive apparatus 1. An interior space 143 of the housing 14 is hermetically enclosed, and includes no or substantially no dirt or dust. The interior space 143 of the housing 14 is preferably filled with a low-density gas, such as, for example, helium gas.

The three disks 11 are preferably arranged at substantially regular intervals in an axial direction through spacers 152, and arranged to be clamped by the clamper 151 and the motor 12. The access portion 13 preferably includes six heads 131, six arms 132, and a head actuator mechanism 133. Each of the arms 132 is arranged to support a separate one of the heads 131. Each of the heads 131 is arranged to magnetically read and/or write information from or to a corresponding one of the disks 11 while being arranged in close proximity to the disk 11. The head actuator mechanism 133 is arranged to actuate each of the arms 132 to move an associated one of the heads 131 relative to a corresponding one of the disks 11. The head 131 is thereby arranged to access a desired location on the rotating disk 11 while being arranged in close proximity to the disk 11, to carry out the reading and/or writing of the information.

Figure 2:
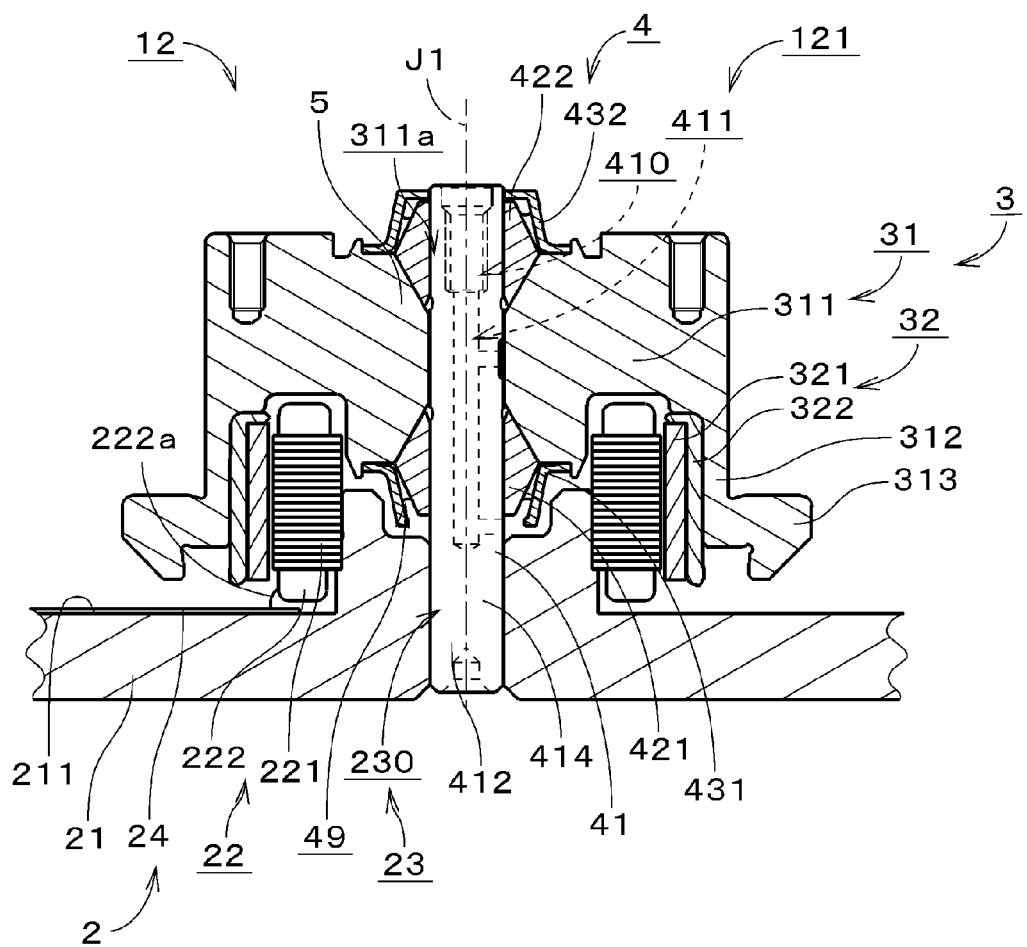
FIG. 2 is a diagram illustrating a motor according to the first preferred embodiment of the present invention.

FIG. 2 is a vertical cross-sectional view of the motor 12. The motor 12 is preferably an outer-rotor motor. The motor 12 includes a stationary portion 2, a rotating portion 3, and a fluid dynamic bearing mechanism 4. The fluid dynamic bearing mechanism 4 will be hereinafter referred to as a "bearing mechanism 4". The rotating portion 3 is supported through the bearing mechanism 4 to be rotatable about a central axis J1 of the motor 12 with respect to the stationary portion 2. The central axis J1 of the motor 12 preferably coincides with a central axis of each of the stationary portion 2, the rotating portion 3, and the bearing mechanism 4.

The stationary portion 2 preferably includes a base plate 21, which is an example of a base portion, a stator 22, and a wiring 24. The base plate 21 is arranged to define a portion of the first housing member 141 illustrated in FIG. 1. The base plate 21 includes a through hole 230 extending in the axial direction therethrough defined in a center thereof. The base plate 21 further includes one connector fitting hole 162 defined therein at a position away from the through hole 230, as represented by a broken line in FIG. 1. The connector fitting hole 162 is arranged to extend through the base plate 21. A connector 161 is arranged in the connector fitting hole 162. The connector fitting hole 162 is preferably arranged to be sealed by the connector 161 and by another method such as, for example, an application of an adhesive. The connector 161 is arranged to be connected to an external circuit 163 outside the housing 14.

Referring to FIG. 2, the stator 22 is preferably fixed to the base plate 21. The stator 22 includes a stator core 221 and coils 222 wound on the stator core 221. The wiring 24 is arranged to extend along an inner bottom surface 211 of the base plate 21. The inner bottom surface 211 is a surface that faces the interior space 143 of the housing 14 illustrated in FIG. 1. The wiring 24 is arranged to extend from the stator 22 to the connector 161, which is represented by a broken line in FIG. 1. One end portion of the wiring 24 is connected to the connector 161, while an opposite end portion thereof is connected to lead wires 222a leading from the coils 222 illustrated in FIG. 2. An example of a preferred form of the wiring 24 is a flexible printed circuit (FPC) board. However, the wiring 24 could also be defined by a wire or wires continuous with the lead wires 222a.

The rotating portion 3 preferably includes a rotor hub 31 and a magnetic member 32. The rotor hub 31 includes a hub body 311, a cylindrical portion 312, and a disk mount portion 313. The cylindrical portion 312 is arranged to project downward from an outer edge portion of the hub body 311. The disk mount portion 313 is arranged to extend radially outward from a bottom portion of the cylindrical portion 312. The magnetic member 32 preferably includes a substantially cylindrical rotor magnet 321 and a back iron 322. The rotor magnet 321 is preferably fixed to an inside of the cylindrical portion 312 with the back iron 322 being arranged therebetween. The rotor magnet 321 is arranged radially opposite the stator 22. A rotational torque is generated due to the interaction between the magnetic flux generated by the stator 22 and the rotor magnet 321.

The hub body 311 includes a central hole portion 311a extending in the axial direction and defined in a center thereof. A portion 5 of the hub body 311 which is in the vicinity of the central axis J1 and which includes the central hole portion 311a will be hereinafter referred to as a "sleeve portion 5".

The bearing mechanism 4 preferably includes a shaft 41, a first cone portion 421, a second cone portion 422, a first cover member 431, a second cover member 432, and a lubricating oil 49. The shaft 41 is inserted in the central hole portion 311a of the sleeve portion 5. A lower portion 412 of the shaft 41 is preferably fitted in the through hole 230 of the base plate 21. The lower portion 412 refers to a portion of the shaft 41 which is inserted in the through hole 230, and will be hereinafter referred to as a "shaft lower portion 412". A portion of the base plate 21 which is in the vicinity of the central axis J1 and which includes the through hole 230 will be hereinafter referred to as an "inner circumferential portion 23". The shaft 41 is arranged to extend in the vertical direction along the central axis J1. The shaft 41 includes a non-through hole portion 411 defined in an interior thereof. The hole portion 411 is arranged to extend downward from an upper end of the shaft 41 along the central axis J1. The hole portion 411 is arranged to have an axial length greater than the axial length of a non-through region 414. The non-through region 414 is defined on a lower side of the hole portion 411 and between the hole portion 411 and a small hole portion defined in a lower end portion of the shaft 41. An upper portion of the hole portion 411 includes a screw hole portion 410.

Referring to FIG. 1, a screw 153 is preferably inserted into the screw hole portion 410 and a hole portion 142a defined in a center of the second housing member 142, which is arranged to cover an upper side of the motor 12. The second housing member 142 and the shaft 41 are thereby fixed to each other. A sealant 120 is preferably arranged at all circumferential positions between an outer circumferential portion of the screw 153 and inner circumferential portions of both the screw hole portion 410 and the hole portion 142a, and at all circumferential positions between an upper portion of the hole portion 142a and a head portion 153a of the screw 153. An example of the sealant 120 is an adhesive.

Referring to FIG. 2, the first cone portion 421 is fixed to the shaft 41 on a lower side of the sleeve portion 5. An upper portion of an outside surface of the first cone portion 421 is arranged to be angled radially outward with decreasing height, while a lower portion of the outside surface of the first cone portion 421 is preferably angled radially outward with increasing height. The second cone portion 422 is fixed to the shaft 41 on an upper side of the sleeve portion 5. As with the first cone portion 421, an upper portion of an outside surface of the second cone portion 422 is preferably angled radially outward with decreasing height, while a lower portion of the outside surface of the second cone portion 422 is arranged to be angled radially outward with increasing height.

Figure 3:
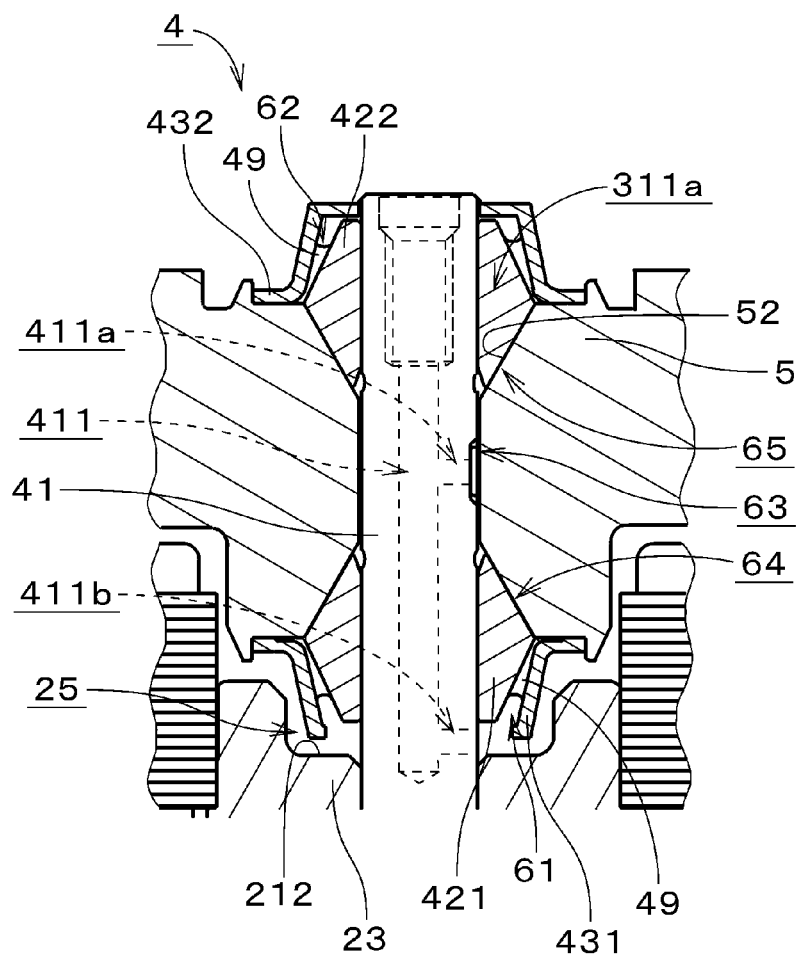
FIG. 3 is a diagram illustrating a bearing mechanism according to the first preferred embodiment of the present invention.

FIG. 3 is a diagram illustrating the bearing mechanism 4 in an enlarged form. A lower portion of an inside surface 52 of the central hole portion 311a of the sleeve portion 5 is arranged to be angled radially outward with decreasing height, while an upper portion of the inside surface 52 is arranged to be angled radially outward with increasing height.

A first inclined gap 64, which is preferably angled radially outward with decreasing height, is defined between the lower portion of the inside surface 52 of the sleeve portion 5 and the upper portion of the outside surface of the first cone portion 421. A second inclined gap 65, which is preferably angled radially outward with increasing height, is defined between the upper portion of the inside surface 52 of the sleeve portion 5 and the lower portion of the outside surface of the second cone portion 422.

The first cover member 431 is attached to a bottom portion of the sleeve portion 5, and is arranged opposite to the outside surface of the first cone portion 421. The second cover member 432 is attached to a top portion of the sleeve portion 5, and is arranged to cover the outside surface and an upper end of the second cone portion 422.

The lubricating oil 49 is preferably arranged in two locations, namely, in the first inclined gap 64 and in the second inclined gap 65. Surfaces of the lubricating oil 49 arranged in the first inclined gap 64 are located in a gap 61 defined between the first cover member 431 and the first cone portion 421, and in a lower portion of a middle gap 63 defined between the shaft 41 and a middle portion of the sleeve portion 5. Surfaces of the lubricating oil 49 arranged in the second inclined gap 65 are located in a gap 62 defined between the second cover member 432 and the second cone portion 422, and in an upper portion of the middle gap 63.

The shaft 41 preferably includes a first communicating portion 411a and a second communicating portion 411b defined therein. The first communicating portion 411a is preferably a first connection channel arranged to establish radial communication between the hole portion 411, which is defined in the interior of the shaft 41, and the middle gap 63, which is arranged in an interior of the bearing mechanism 4. The second communicating portion 411b is preferably a second connection channel arranged to establish radial communication between the hole portion 411 and a space 25 defined on an upper side of an upper surface 212 of the inner circumferential portion 23, i.e., a space on a lower side of the bearing mechanism 4. An end opening of the second communicating portion 411b is arranged in the vicinity of the surface of the lubricating oil 49 located in the gap 61 defined between the first cover member 431 and the first cone portion 421. The middle gap 63 is arranged to be in communication with the space 25 on the lower side of the bearing mechanism 4 through the first communicating portion 411a, the hole portion 411, and the second communicating portion 411b. Pressure in the middle gap 63 is thereby arranged to be equal to or substantially equal to pressure in the interior space 143 of the disk drive apparatus 1. As a result, balance between the upper and lower surfaces of the lubricating oil 49 held in the first inclined gap 64 is maintained in a substantially constant state. Similarly, balance between the upper and lower surfaces of the lubricating oil 49 held in the second inclined gap 65 is also maintained in a substantially constant state.

While the motor 12 is driven, a fluid dynamic pressure is generated through the lubricating oil 49 in each of the first inclined gap 64 and the second inclined gap 65. The sleeve portion 5 is thereby supported to be rotatable with respect to the shaft 41. In the motor 12, the sleeve portion 5 is arranged to define a portion of the bearing mechanism 4 as a portion supported by the shaft 41. That is, the sleeve portion 5 is a portion of the rotating portion 3 and a portion of the bearing mechanism 4 at the same time.

In the motor 12, the axial length of the hole portion 411 is greater than the axial length of the non-through region 414 makes it possible to arrange the second communicating portion 411b in a lower portion of the bearing mechanism 4, and also to arrange the first cone portion 421 in the lower portion of the bearing mechanism 4. As a result, bearing portions which are defined in the first inclined gap 64 and the second inclined gap 65 and each of which is arranged to generate a fluid dynamic pressure in the lubricating oil 49 can be arranged at a sufficient axial distance from each other to achieve an improvement in bearing rigidity of the bearing mechanism 4.

Figure 4:
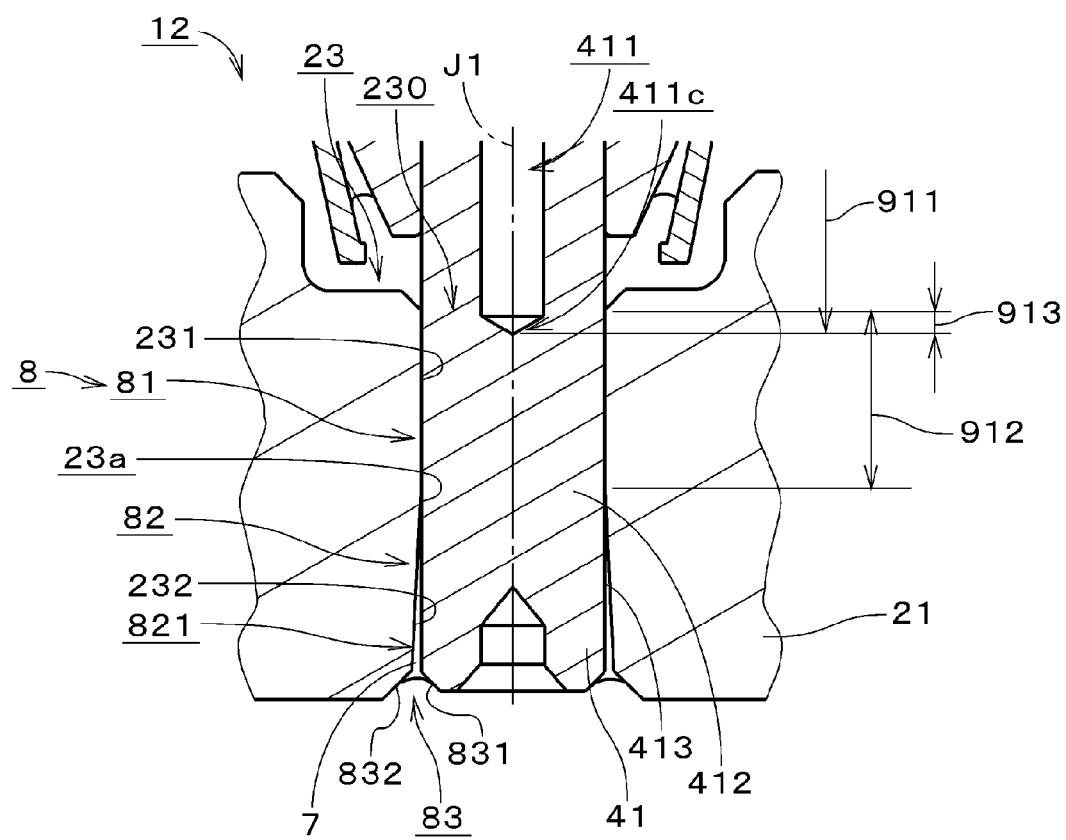
FIG. 4 is a diagram illustrating a lower portion of a shaft and its vicinity according to the first preferred embodiment of the present invention.

FIG. 4 is a diagram illustrating the shaft lower portion 412 of the motor 12 and its vicinity in an enlarged form. An outer circumferential surface 413 of the shaft lower portion 412, which is a portion of the shaft 41 which is inserted in the through hole 230, is a cylindrical surface centered on the central axis J1. Hereinafter, the outer circumferential surface 413 will be referred to as an "inserted outer circumferential surface 413". An upper portion 231 of an inner circumferential surface 23a of the inner circumferential portion 23 includes a cylindrical surface centered on the central axis J1. Hereinafter, the upper portion 231 will be referred to as an "inner circumferential surface upper portion 231". A lower portion 232 of the inner circumferential surface 23a includes an angled surface which is arranged to gradually decrease in diameter with increasing height. Hereinafter, the lower portion 232 will be referred to as an "inner circumferential surface lower portion 232".

An upper portion of the inserted outer circumferential surface 413 is press fitted in the inner circumferential surface upper portion 231. Hereinafter, a region defined between the upper portion of the inserted outer circumferential surface 413 and the inner circumferential surface upper portion 231 will be referred to as a "press-fitting region 81". Regarding the shaft 41, a lower end 411c of the hole portion 411, which is defined in the interior of the shaft 41, is arranged at a level slightly lower than that of an upper end of the press-fitting region 81. The hole portion 411 is thus arranged to overlap in a radial direction with the press-fitting region 81. To be more accurate, an axial extension range 911 of the hole portion 411 and an axial extension range 912 of the press-fitting region 81 are arranged to overlap with each other. In the motor 12, the axial length of a range 913 over which the two axial extension ranges 911 and 912 overlap with each other is preferably arranged to be about half or less than about half the axial length of the press-fitting region 81, for example. As a result, in the present preferred embodiment, a sufficient strength of the press fit of the shaft 41 to the base plate 21 is achieved as opposed to the case where the entire press-fitting region 81 is arranged to overlap with the axial extension range 912 of the hole portion.

A seal gap 821 is defined between a lower portion of the inserted outer circumferential surface 413 and the inner circumferential surface lower portion 232. The seal gap 821 is arranged to gradually decrease in radial width with increasing height. An adhesive 7 is preferably arranged in the seal gap 821 over an entire circumference thereof, so that the shaft lower portion 412 is adhered to the inner circumferential portion 23. The adhesive 7 is preferably an epoxy thermosetting adhesive. Hereinafter, a substantially cylindrical region in which the seal gap 821 is defined will be referred to as an "adhesion region 82". Note that the adhesive 7 may be arranged in the press-fitting region 81 as well. As described above, the shaft 41 is preferably fixed to the inner circumferential portion 23 through both press fit and adhesion. Hereinafter, an entire region including the press-fitting region 81, which is defined between the inner circumferential portion 23 and the shaft lower portion 412, and the adhesion region 82, which is defined on a lower side of the press-fitting region 81, will be referred to as a "fixing region 8".

Figure 5:
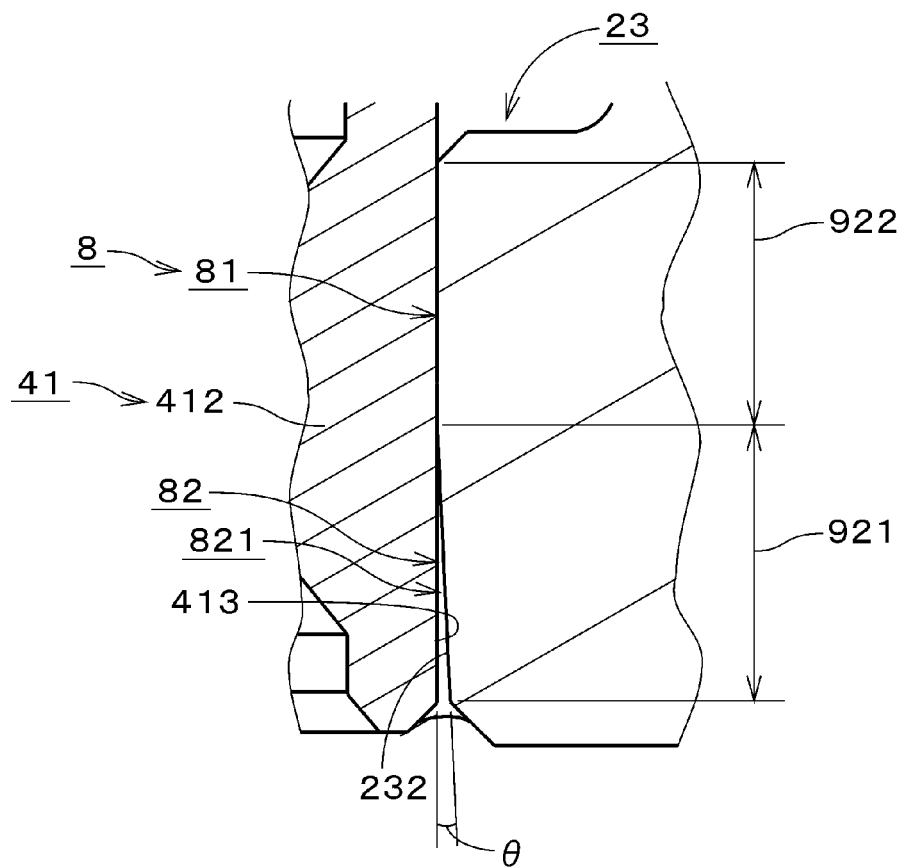
FIG. 5 is a diagram illustrating the lower portion of the shaft and its vicinity according to the first preferred embodiment of the present invention.

Referring to FIG. 5, the axial length 921 of the adhesion region 82 and the axial length 922 of the press-fitting region 81 within the fixing region 8 are preferably arranged to be equal or substantially equal to each other. An angle θ defined between the inner circumferential surface lower portion 232 and the inserted outer circumferential surface 413 of the shaft lower portion 412 in a cross-section of the inner circumferential portion 23 and the shaft 41 taken on a plane including the central axis J1, i.e., an angle of the seal gap 821, is preferably arranged to be in the range of about 3 degrees to about 4 degrees. Referring to FIG. 4, on a lower side of the adhesion region 82, an annular chamfer portion 83 is preferably defined by a chamfer 831 defined in a lower end portion of the inserted outer circumferential surface 413 and a chamfer 832 defined in a lower end portion of the inner circumferential surface 23a. The annular chamfer portion 83 is arranged to gradually increase in radial width with decreasing height.

In the motor 12, the adhesive 7 is preferably arranged in the seal gap 821 over the entire circumference thereof to seal a gap defined between the shaft 41 and the inner circumferential portion 23. This contributes to preventing the gas arranged in the interior of the housing 14 from leaking out through the gap defined between the shaft 41 and the inner circumferential portion 23.

Figure 6:
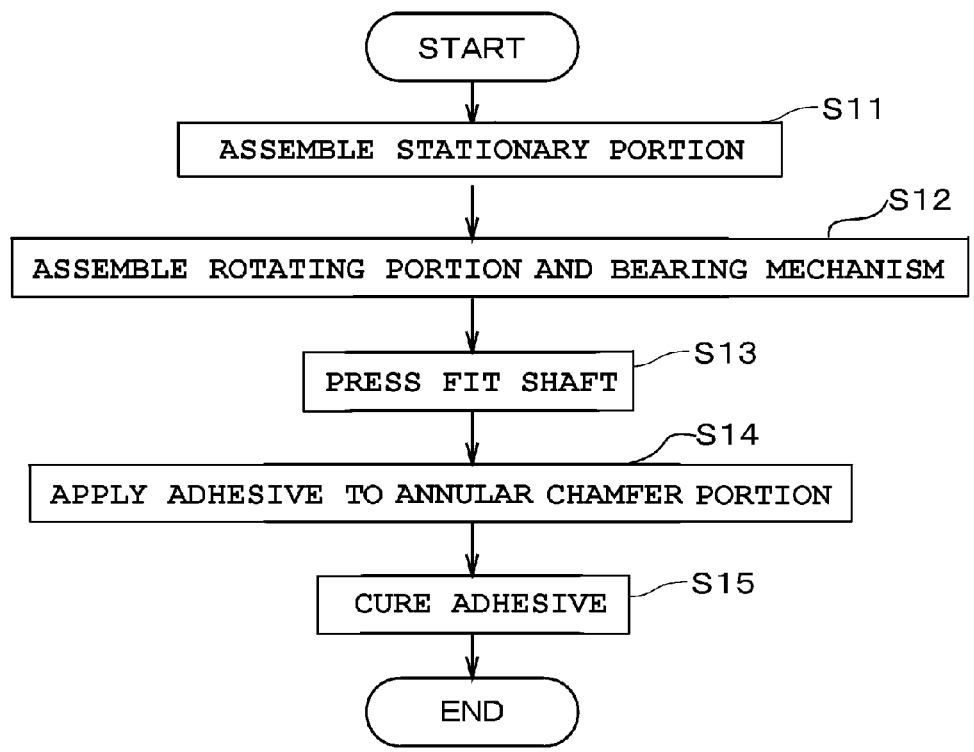
FIG. 6 is a flowchart illustrating a procedure of assembling the motor according to the first preferred embodiment of the present invention.

FIG. 6 is a flowchart illustrating a procedure of assembling the motor 12. First, the stationary portion 2 illustrated in FIG. 2 is assembled, and the rotating portion 3 and the bearing mechanism 4 are assembled as a single assembly 121 (steps S11 and S12). Note that the stationary portion 2 may be assembled after or simultaneously with the assembly of the assembly 121. The same holds true for other preferred embodiments of the present invention described below.

Figure 7:
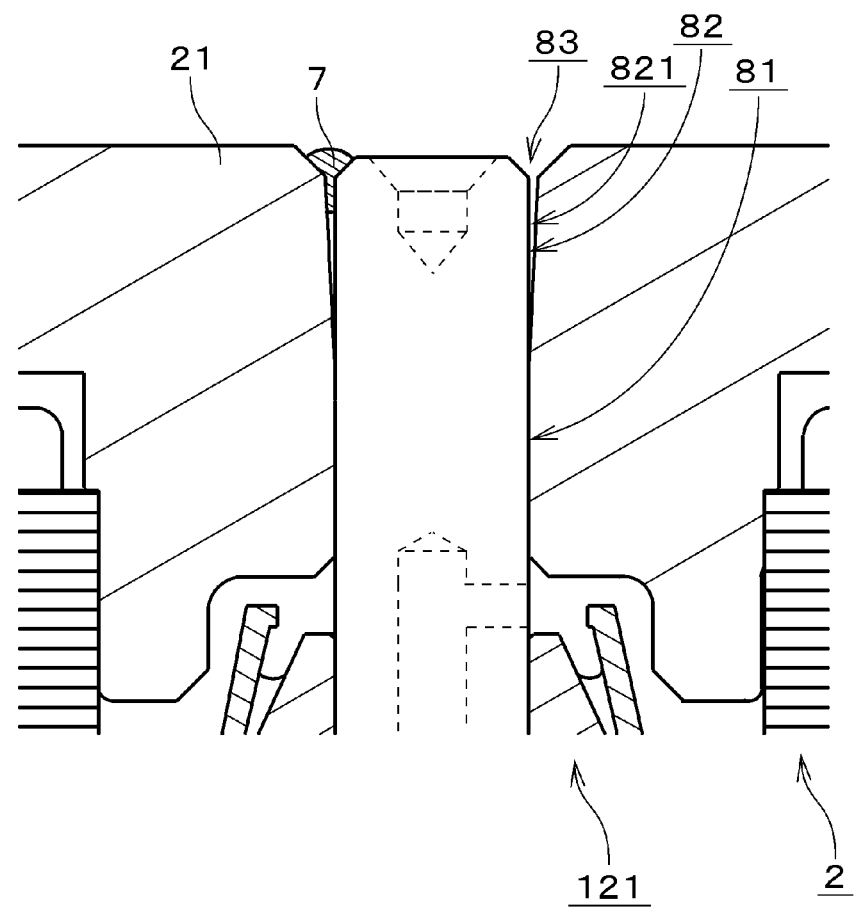
FIG. 7 is a diagram illustrating the lower portion of the shaft and its vicinity according to the first preferred embodiment of the present invention.

Next, referring to FIG. 4, the shaft lower portion 412 is press fitted into the through hole 230 of the inner circumferential portion 23 (step S13). As a result, the shaft 41 is temporarily fixed to the base plate 21 in the fixing region 8. Referring to FIG. 7, the assembly 121 and the stationary portion 2 are turned upside down, and the adhesive 7, which is now in a liquid state, is applied preferably to a single location in the annular chamfer portion 83 (step S14). The adhesive 7 then enters into the seal gap 821, traveling downward in FIG. 7, i.e., in the direction of the press-fitting region 81, and preferably spreads evenly in a circumferential direction in the seal gap 821. At this time, air inside the seal gap 821 travels to an outside of the base plate 21 through a portion of the annular chamfer portion 83 where the adhesive 7 is not applied. That is, the air is replaced by the adhesive 7 as a result of the spread of the adhesive 7 in the seal gap 821 and the accompanying travel of the air inside the seal gap 821 to the outside of the base plate 21. A sufficient spreading of the adhesive 7 throughout the seal gap 821 is achieved by capillary action to thereby permit little or no air to remain in the seal gap 821. Air remaining in the seal gap results in a decrease in the area (including the axial length) of the adhesion region, which may lead to an increased likelihood of a gas passing through the adhesion region. In the present preferred embodiment, the air is replaced by the adhesive 7 in the seal gap 821 according to the above-described mechanism, to secure a sufficient area of the adhesion region 82.

After the spreading of the adhesive 7 throughout the entire seal gap 821 is complete, the stationary portion 2 and the assembly 121 are carried into a heating device, and the adhesive 7 is heated and cured (step S15). As a result, the assembly 121 and the base plate 21 are securely fixed to each other to complete an operation of assembling the motor 12. During the assembly of the motor 12, the shaft 41 is temporarily fixed to the base plate 21, and this eliminates a need to use a large-scale jig to fix relative positions of the stationary portion and the assembly in the heating device as would be required if the shaft and the base plate were to be fixed to each other through only the adhesive. This in turn facilitates the operation of assembling the motor 12.

The structure of the motor 12 and the operation of assembling the motor 12 according to the first preferred embodiment have been described above. In the disk drive apparatus 1 including the motor 12, the adhesive 7 is arranged in the seal gap 821 over the entire circumference thereof, and this contributes to preventing the internal gas from leaking out through the gap defined between the shaft 41 and the inner circumferential portion 23. The technique of sealing the seal gap 821 with the adhesive 7 is particularly suitable for a case where the internal gas is a helium gas. Even if the base plate 21 of the disk drive apparatus 1 needs to have a small thickness in order to enable a large number of disks 11 to be mounted in the disk drive apparatus 1 while reducing the height of the disk drive apparatus 1, adoption of the above-described technique makes it possible to seal the gap defined between the shaft 41 and the base plate 21.

The seal gap 821 is arranged to have a so-called tapered shape, gradually decreasing in radial width with increasing height. This contributes to causing the adhesive 7 to spread into the seal gap 821. This contributes to preventing air from remaining in the seal gap 821. As a result, an improvement in reliability of the disk drive apparatus 1 is achieved.

The hole portion 411 defined in the interior of the shaft 41 does not extend through the shaft 41 in the axial direction. This contributes to preventing the internal gas from passing through the hole portion 411 and leaking out downwardly of the base plate 21.

The sealant 120 is arranged at all circumferential positions between the upper portion of the hole portion 142a of the second housing member 142 and the head portion 153a of the screw 153. This contributes to preventing the gas arranged inside the disk drive apparatus 1 from leaking out through a slight gap defined between the second housing member 142 and the head portion 153a of the screw 153. Moreover, the sealant 120 is also arranged at all circumferential positions between the outer circumferential portion of the screw 153 and the inner circumferential portions of both the screw hole portion 410 and the hole portion 142a. This contributes to more securely preventing a leakage of the gas.

Figure 8:
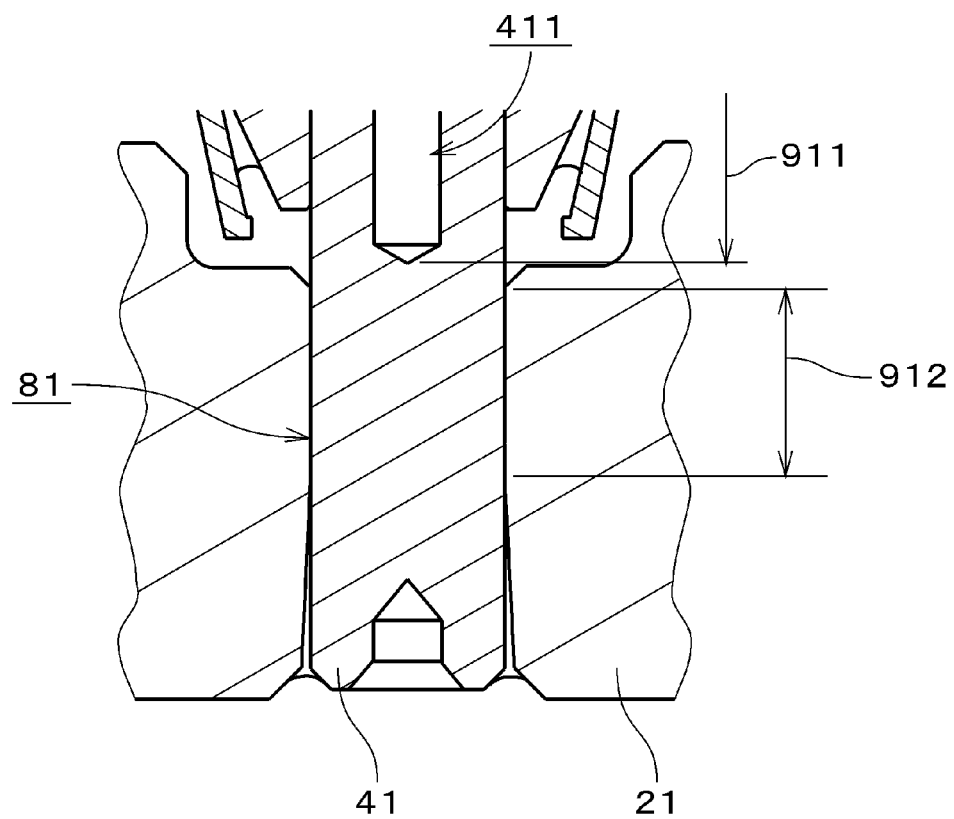
FIG. 8 is a diagram illustrating a portion of a motor according to a modification of the first preferred embodiment of the present invention.

Referring to FIG. 8, in a motor 12 according to a modification of the first preferred embodiment, the axial extension range 911 of the hole portion 411 and the axial extension range 912 of the press-fitting region 81 may be arranged not to overlap with each other. In this case, an increase in the strength of the press fit of the shaft 41 to the base plate 21 is achieved.

The axial length 921 of the adhesion region 82 and the axial length 922 of the press-fitting region 81 within the fixing region 8 are arranged to be equal or substantially equal to each other. This enables a sufficient amount of the adhesive to be arranged between the shaft 41 and the inner circumferential portion 23 to achieve the sealing. The axial length of the adhesion region 82 is preferably arranged to be in the range between about half the axial length of the press-fitting region 81 and about twice the axial length of the press-fitting region 81. The sealing of the gap defined between the shaft 41 and the base plate 21 with the adhesive 7 is thereby achieved. The same holds true for other preferred embodiments of the present invention described below.

In the motor 12, the angle of the seal gap 821 is preferably arranged to be in the range of about 3 degrees to about 4 degrees to retain the adhesive 7 therein, for example. A leakage of the gas arranged inside the disk drive apparatus 1 can be thereby prevented. The angle of the seal gap 821 is preferably arranged to be more than about 0.1 degrees, for example, in order to allow a sufficient amount of the adhesive 7 to be held in the seal gap 821. In addition, the angle of the seal gap 821 is preferably arranged to be less than about 10 degrees, for example, in order to securely prevent the internal gas from penetrating through the adhesive 7 and leaking out of the base plate 21. The angle of the seal gap 821 is more preferably arranged to be in the range of about 0.2 degrees to about 4 degrees, and still more preferably arranged to be in the range of about 3 degrees to about 4 degrees, for example.

Note that a hydrogen gas, instead of the helium gas, may also be used as the gas fed into the interior of the housing 14 of the disk drive apparatus 1. Also note that a mixture of the helium gas and the hydrogen gas may be used as the gas fed into the interior of the housing 14 if desired. Also note that a mixture of air and any one of the helium gas, the hydrogen gas, and the mixture of the helium gas and the hydrogen gas may be used as the gas fed into the interior of the housing 14. The same holds true for other preferred embodiments of the present invention described below.

The adhesive 7 used in the motor 12 is preferably a thermosetting adhesive, for example. In this case, the adhesive is able to fix the shaft 41 and the base plate 21 to each other with a greater joint strength than in the case where the adhesive 7 possesses only an anaerobic property or only a UV-curing property. A variety of adhesives that possess the anaerobic property and/or the UV-curing property may be used in the motor 12, as long as the adhesives possess a thermosetting property. The same holds true for other preferred embodiments of the present invention described below.

Figure 9:
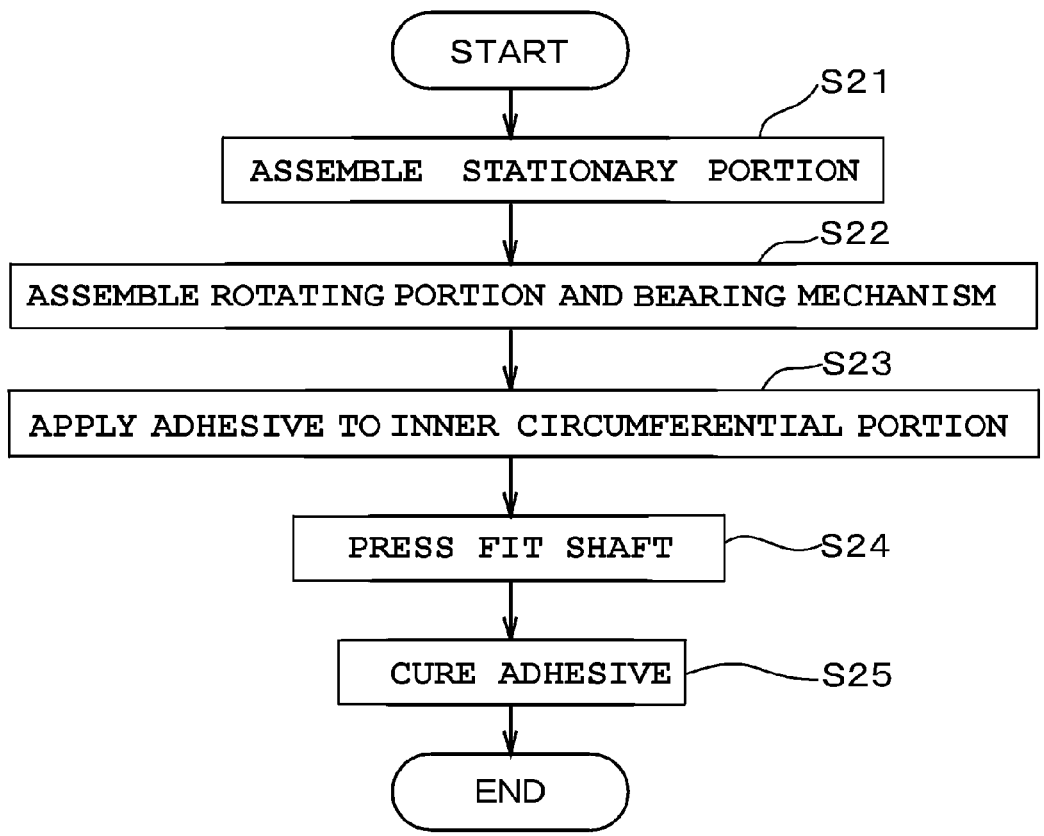
FIG. 9 is a flowchart illustrating a procedure of assembling the motor according to a modification of the first preferred embodiment of the present invention.
Figure 10:
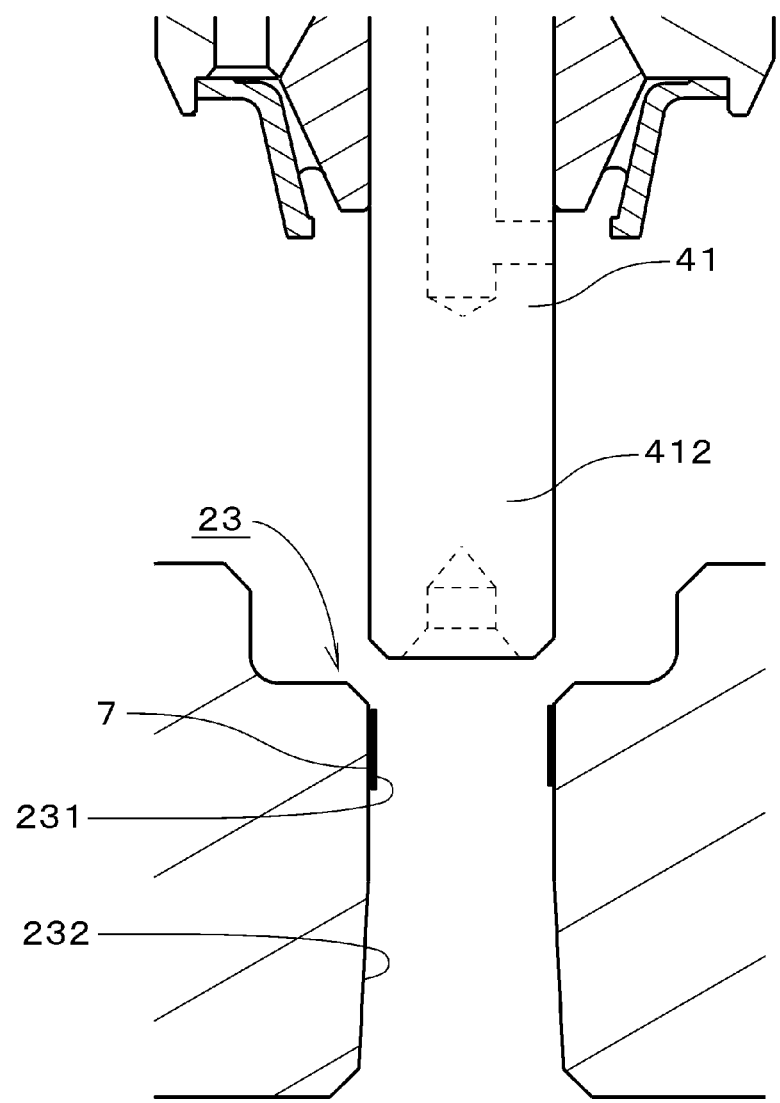
FIG. 10 is a diagram illustrating the motor in the course of assembling thereof according to a modification of the first preferred embodiment of the present invention.

Next, a procedure of assembling the motor 12 according to a modification of the first preferred embodiment will now be described below with reference to FIG. 9. First, as in the above-described operation of assembling the motor 12, the stationary portion 2 as illustrated in FIG. 2 is assembled, and the rotating portion 3 and the bearing mechanism 4 are assembled as the single assembly 121 (steps S21 and S22). Next, referring to FIG. 10, the adhesive 7, which is now in the liquid state, is applied to all circumferential positions on the inner circumferential surface upper portion 231 of the inner circumferential portion 23 (step S23). The shaft 41 is inserted from above into the inner circumferential portion 23, so that the shaft lower portion 412 is press fitted to the inner circumferential surface upper portion 231 (step S24).

At this time, the adhesive 7 is spread to the inner circumferential surface lower portion 232 in accordance with movement of the shaft 41. The adhesive 7 is held in the seal gap 821 over the entire circumference thereof as illustrated FIG. 4. In the motor 12, the adhesive 7 also serves as a lubricant to facilitate the insertion of the shaft 41. The base plate 21 is thereafter heated, and the adhesive 7 is cured (step S25) to complete the operation of assembling the motor 12.

In the motor 12, the adhesive 7 is arranged in the seal gap 821 over the entire circumference thereof. This contributes to preventing the gas arranged inside the disk drive apparatus 1 from leaking out through the gap defined between the shaft 41 and the inner circumferential portion 23. The adhesive 7 is held in the entire seal gap 821 through capillary action, so that air is prevented from remaining in the seal gap 821. Note that in the assembly of the motor 12, the adhesive 7, which is then in the liquid state, may be applied to both the inserted outer circumferential surface 413 of the shaft lower portion 412 and the inner circumferential surface upper portion 231.

Figure 11:
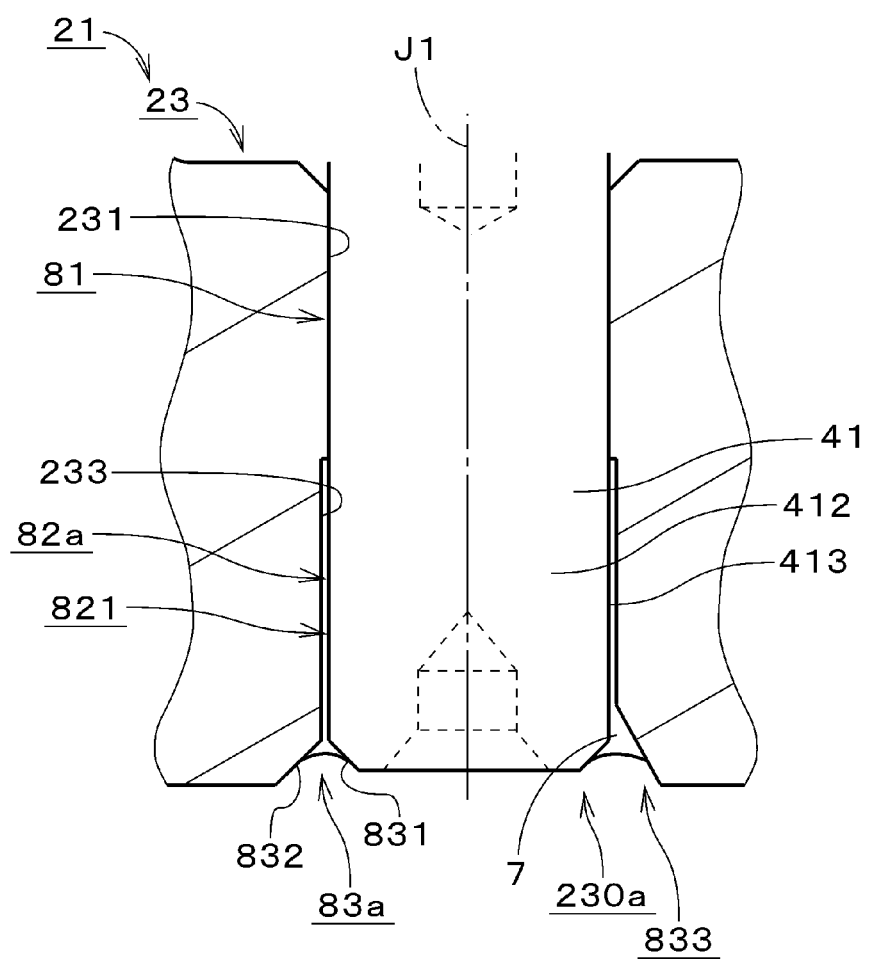
FIG. 11 is a diagram illustrating a lower portion of a shaft of a motor and its vicinity according to a second preferred embodiment of the present invention.
Figure 12:
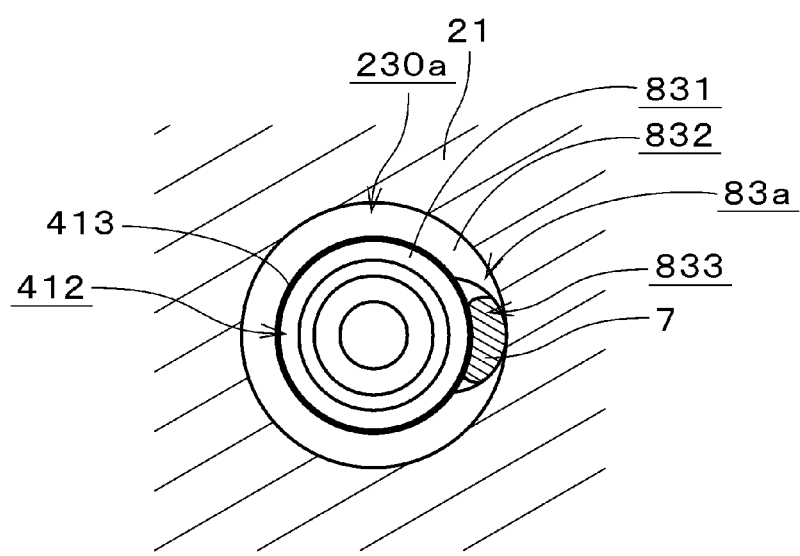
FIG. 12 is a bottom view of the shaft and a base plate according to the second preferred embodiment of the present invention.

FIG. 11 is a diagram illustrating a shaft lower portion 412 of a motor according to a second preferred embodiment of the present invention and its vicinity in an enlarged form. An inner circumferential portion 23 of a base plate 21 preferably includes an inner circumferential surface upper portion 231 and a portion 233 defined on a lower side of the inner circumferential surface upper portion 231 and which is defined by a cylindrical surface having a diameter slightly greater than that of the inner circumferential surface upper portion 231. Hereinafter, the portion 233 will be referred to as an "inner circumferential surface lower portion 233". In FIG. 11, the greater diameter of the inner circumferential surface lower portion 233 is emphasized. The same holds true for FIGS. 14 and 16 referenced below. FIG. 12 is a bottom view of the base plate 21 and the shaft lower portion 412. In FIG. 12, a lower surface of the base plate 21 and an adhesive 7 are indicated by parallel oblique lines. As illustrated in FIGS. 11 and 12, a recessed portion 833 which is recessed upward is defined in a portion of a lower end portion 230a of an inner circumferential surface 23a of the inner circumferential portion 23. The lower end portion 230a includes a chamfer 832 defined therein except at the recessed portion 833.

In the motor according to the second preferred embodiment, the recessed portion 833, the chamfer 832, and a chamfer 831 defined in a lower end portion of an inserted outer circumferential surface 413 of the shaft lower portion 412 are arranged to together define an annular chamfer portion 83a which is recessed upward as with the annular chamfer portion 83a according to the first preferred embodiment. The motor according to the second preferred embodiment is otherwise preferably similar in structure to the motor 12 according to the first preferred embodiment. Accordingly, like members or portions are designated by like reference numerals, and redundant description is omitted.

Referring to FIG. 11, a seal gap 821 extending parallel or substantially parallel to a central axis J1 is defined in an adhesion region 82a defined between the inner circumferential surface lower portion 233 and the inserted outer circumferential surface 413. The seal gap 821 is arranged to be in connection with the recessed portion 833. The adhesive 7 is arranged to extend continuously in the recessed portion 833 and the seal gap 821. In the seal gap 821, the adhesive 7 is arranged over an entire circumference thereof. As a result, a gap defined between a shaft 41 and the inner circumferential portion 23 is sealed.

Figure 13:
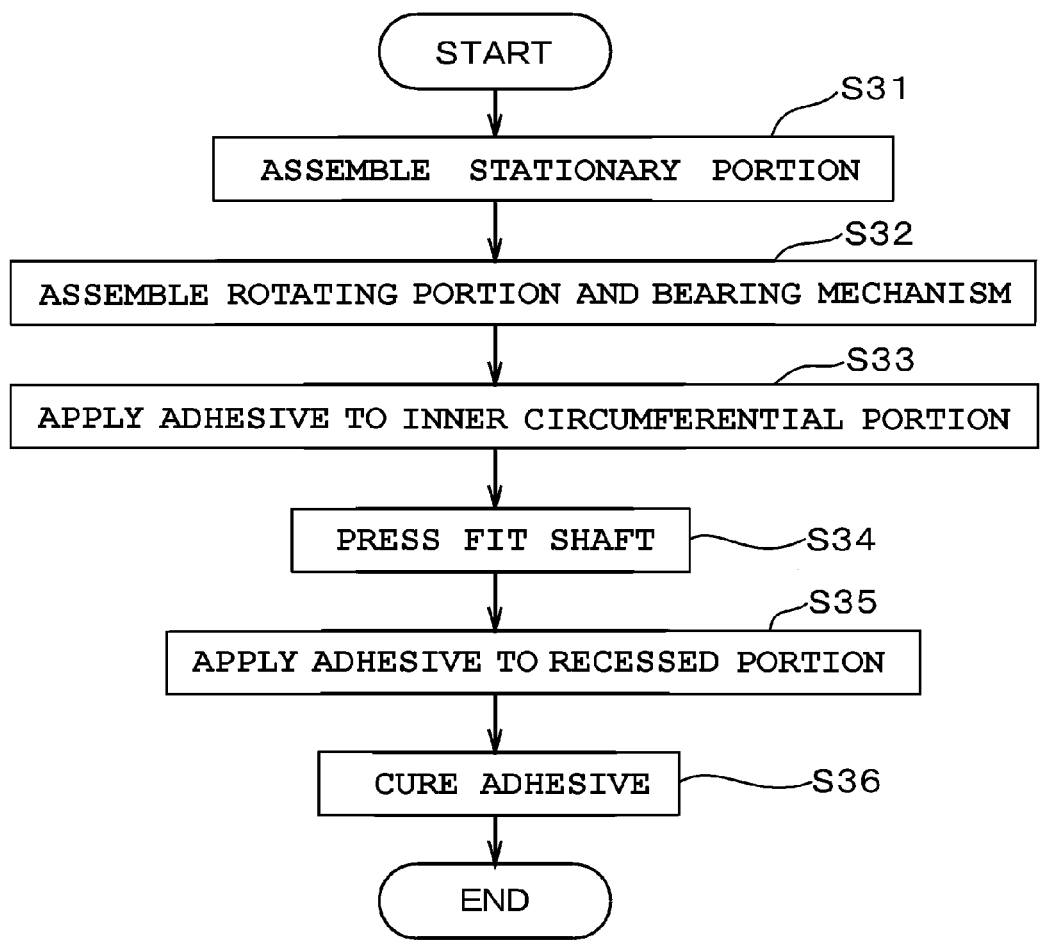
FIG. 13 is a flowchart illustrating a procedure of assembling the motor according to the second preferred embodiment of the present invention.

FIG. 13 is a flowchart illustrating a procedure of assembling the motor according to the second preferred embodiment. First, as with the procedure according to the first preferred embodiment, a stationary portion 2 is assembled, and a rotating portion 3 and a bearing mechanism 4 are assembled as a single assembly 121 (steps S31 and S32). Next, the adhesive 7, which is now in the liquid state, is applied to all circumferential positions on the inner circumferential surface upper portion 231 of the inner circumferential portion 23 in a manner similar to that illustrated in FIG. 10 (step S33). Referring to FIG. 11, the shaft lower portion 412 is press fitted to the inner circumferential portion 23 (step S34). At this time, the adhesive 7 is spread to the inner circumferential surface lower portion 233. The seal gap 821 is defined between the inserted outer circumferential surface 413 of the shaft lower portion 412 and the inner circumferential surface lower portion 233, and most of the adhesive 7 is held in the seal gap 821.

Next, referring to FIG. 12, with the base plate 21 turned upside down, an additional adhesive 7, which is now in the liquid state, is applied to the recessed portion 833 in the annular chamfer portion 83a (step S35). The adhesive 7 travels in the direction of the press-fitting region 81 illustrated in FIG. 11 into the seal gap 821, that is, to the far side of the page of FIG. 12, and the adhesive 7 is spread substantially evenly in the circumferential direction. At this time, air inside the seal gap 821 travels through a portion of the annular chamfer portion 83 which does not abut on the recessed portion 833 to an outside of the base plate 21, so that little or no air remains in the seal gap 821. The adhesive 7 is thereafter heated and cured (step S36) to complete the operation of assembling the motor.

Also in the motor according to the second preferred embodiment, the adhesive 7 is arranged in the seal gap 821 over the entire circumference thereof, and this contributes to preventing the internal gas from leaking out through the gap defined between the shaft 41 and the inner circumferential portion 23. Moreover, after the shaft 41 is temporarily fixed to the base plate 21, the adhesive 7, which is then in the liquid state, is applied to only the recessed portion 833 in the annular chamfer portion 83a. This contributes to efficiently discharging the air inside the seal gap 821 to the outside of the base plate 21 through a portion of the annular chamfer portion 83a which does not abut on the recessed portion 833. That is, the air inside the seal gap 821 is caused to travel to the outside of the base plate 21 in parallel with the spreading of the adhesive 7 through the seal gap 821, so that the air is replaced by the adhesive 7.

Figure 14:
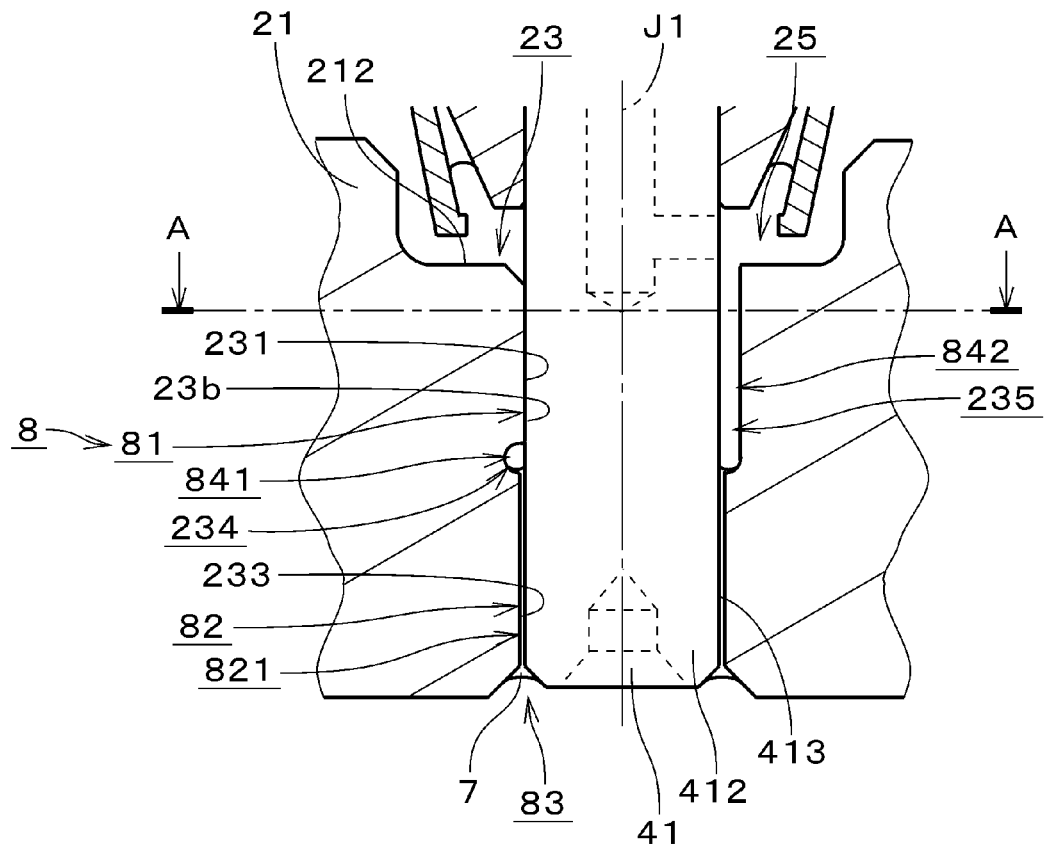
FIG. 14 is a diagram illustrating a lower portion of a shaft of a motor and its vicinity according to a third preferred embodiment of the present invention.

FIG. 14 is a diagram illustrating a shaft lower portion 412 of a motor according to a third preferred embodiment of the present invention and its vicinity. As with the second preferred embodiment, an inner circumferential surface 23*b* of an inner circumferential portion 23 includes an inner circumferential surface upper portion 231 defined by a cylindrical surface, and an inner circumferential surface lower portion 233 defined by a cylindrical surface having a diameter slightly greater than that of the inner circumferential surface upper portion 231. A first groove portion 234 which is annular and which extends in the circumferential direction is defined between the inner circumferential surface upper portion 231 and the inner circumferential surface lower portion 233. At least one second groove portion 235, each of which extends in the axial direction, is defined in the inner circumferential surface upper portion 231. That is, the inner circumferential portion 23 according to the third preferred embodiment preferably is similar in structure to the inner circumferential portion 23 according to the second preferred embodiment except that the recessed portion 833 is eliminated, and that the first groove portion 234 and the second groove portion(s) 235 are provided. The motor according to the third preferred embodiment preferably is similar in structure to the motor 12 according to the first preferred embodiment except in the structure of the inner circumferential portion 23. Accordingly, like members or portions are designated by like reference numerals, and redundant description is omitted. Note that the number of second groove portions 235 may be more than one.

In a fixing region 8, a gap 841 extending over an entire circumference is defined between the first groove portion 234 and an inserted outer circumferential surface 413 of the shaft lower portion 412. The gap 841 is defined at a boundary between a press-fitting region 81 and an adhesion region 82, that is, at a boundary between the seal gap 821 and the press-fitting region 81. The gap 841 is arranged to be in connection with the seal gap 821. The radial width of the gap 841 is arranged to be greater than that of the seal gap 821. The gap 841 can be considered as a portion of the seal gap 821 which is arranged to have an increased width. Hereinafter, the gap 841 will be referred to as an "increased-width gap portion 841".

Figure 15:
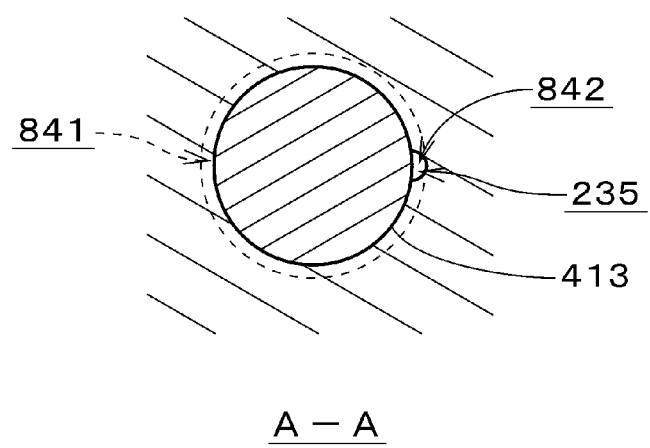
FIG. 15 is a cross-sectional view of the shaft and a base plate according to the third preferred embodiment of the present invention.

FIG. 15 is a cross-sectional view of a shaft 41 and a base plate 21 illustrated in FIG. 14 taken along line A-A in FIG. 14. Referring to FIGS. 14 and 15, a communicating channel 842 extending in the axial direction is defined between the second groove portion 235 and the inserted outer circumferential surface 413. The communicating channel 842 is arranged to connect the increased-width gap portion 841 with a space 25 defined on an upper side of an upper surface 212 of the inner circumferential portion 23 illustrated in FIG. 14. The radial width of the communicating channel 842 is preferably greater than that of the seal gap 821. The communicating channel may be defined either within a base portion or between a lower portion of the shaft 41 and an inner circumferential portion 23 of the base portion.

A procedure of assembling the motor according to the third preferred embodiment is preferably similar to that according to the second preferred embodiment. When the shaft lower portion 412 is inserted into the inner circumferential portion 23, the shaft lower portion 412 is press fitted to the inner circumferential portion 23 in a situation in which an adhesive 7, which is now in the liquid state, has been applied to all circumferential positions on the inner circumferential surface upper portion 231. At this time, the adhesive 7 is caused to spread into the increased-width gap portion 841. Note, however, that the amount of the adhesive 7 is adjusted so that the adhesive 7 may not fill up the increased-width gap portion 841 and the communicating channel 842.

Next, with the base plate 21 turned upside down, an additional adhesive 7, which is now in the liquid state, is preferably applied to all circumferential positions in an annular chamfer portion 83. The adhesive 7 travels in the direction of the increased-width gap portion 841 into the seal gap 821. At this time, air inside the seal gap 821 travels through the increased-width gap portion 841 and the communicating channel 842 to the space 25 defined on the upper side of the upper surface 212 of the base plate 21.

The adhesive 7 is spread substantially evenly in the entire seal gap 821. Thereafter, the base plate 21 is heated to cure the adhesive 7.

In the third preferred embodiment, as well as in the first preferred embodiment, the adhesive 7 is arranged in the seal gap 821 over the entire circumference thereof, and this contributes to preventing a leakage of a gas arranged inside a disk drive apparatus 1. Moreover, by providing the increased-width gap portion 841 and the communicating channel 842, it is possible to more securely prevent air from remaining in the seal gap 821. Even if air remains in a portion of the seal gap 821 which is in the vicinity of the increased-width gap portion 841, the air is caused to travel through the increased-width gap portion 841 and the communicating channel 842 to the space 25 when the base plate 21 is heated, which prevents an increase in pressure in the seal gap 821 due to an expansion of the air. This contributes to preventing the adhesive 7 from leaking out of the seal gap 821.

In the third preferred embodiment, the adhesive 7 may be arranged in the increased-width gap portion 841 over an entire circumference thereof. Also, the adhesive 7 may be arranged to close a lower portion of the communicating channel 842. Also, if the adhesive 7 applied in the first instance does not close the communicating channel 842 when the shaft 41 is inserted into the inner circumferential portion 23, the radial width of the communicating channel 842 may be arranged to be equal to that of the seal gap 821. In the assembly of the motor, the adhesive 7 may be applied to the annular chamfer portion 83 in a situation in which a lower surface of the base plate 21 is arranged to face downward. Even in this case, the adhesive 7 is allowed to enter into the seal gap 821 through capillary action. The same holds true for a fourth preferred embodiment of the present invention described below.

Figure 16:
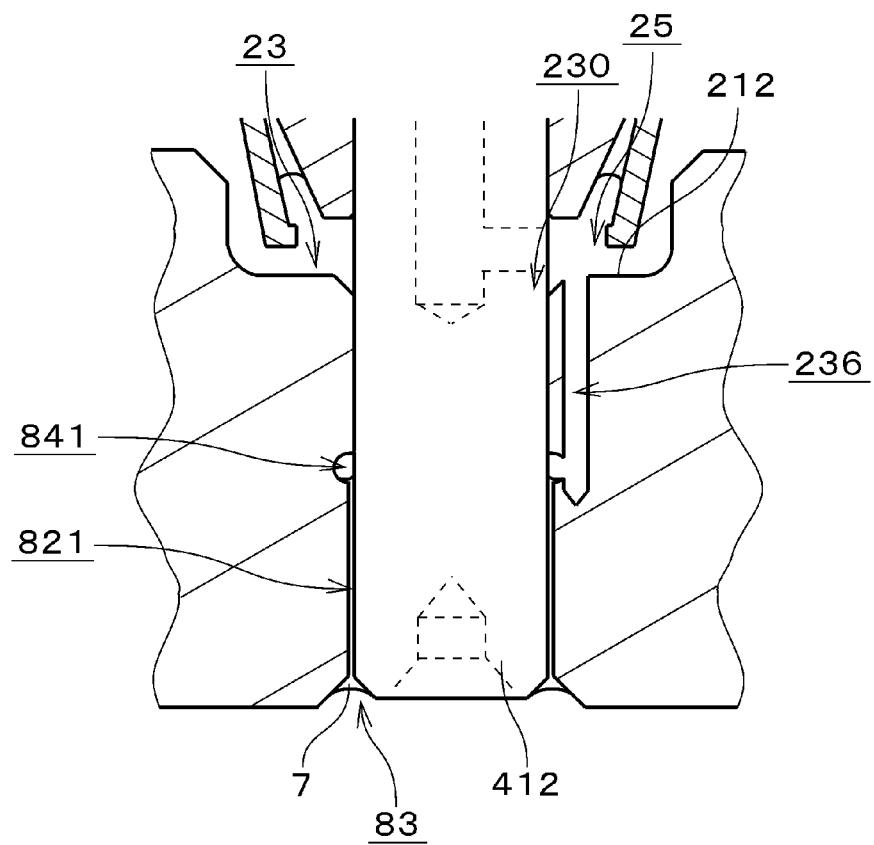
FIG. 16 is a diagram illustrating a lower portion of a shaft of a motor and its vicinity according to a fourth preferred embodiment of the present invention.
Figure 17:
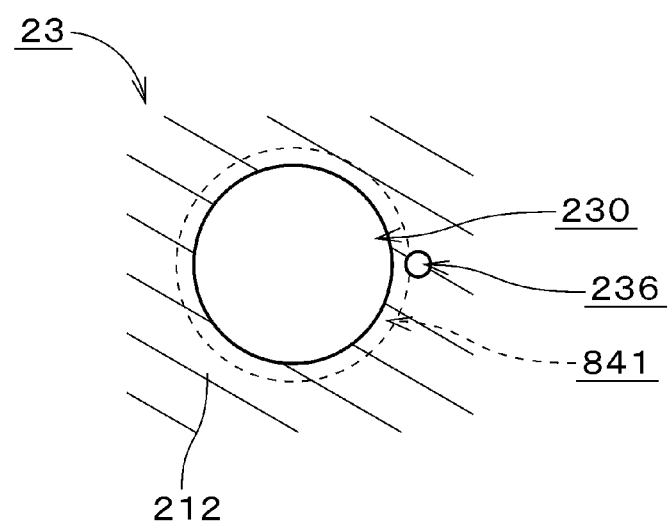
FIG. 17 is a plan view of a base plate according to the fourth preferred embodiment of the present invention.

FIG. 16 is a diagram illustrating a shaft lower portion 412 of a motor according to the fourth preferred embodiment and its vicinity. FIG. 17 is a plan view of an inner circumferential portion 23 of a base plate 21. In FIG. 17, an upper surface 212 of the inner circumferential portion 23 is indicated by parallel oblique lines. In place of the second groove portion 235 illustrated in FIGS. 14 and 15, a hole portion 236 is defined in the inner circumferential portion 23. The hole portion 236 is arranged near a through hole 230, and arranged to extend from the upper surface 212 in the axial direction. The motor according to the fourth preferred embodiment preferably is otherwise similar in structure to the motor according to the third preferred embodiment. A portion of an increased-width gap portion 841 is arranged to be in connection with a radially inner portion of an inside surface of the hole portion 236. In the fourth preferred embodiment, the hole portion 236 preferably defines a communicating channel that joins the increased-width gap portion 841 to a space 25 defined on an upper side of the inner circumferential portion 23.

A procedure of assembling the motor according to the fourth preferred embodiment preferably is similar to the procedure of assembling the motor according to the third preferred embodiment. In the assembly of the motor, an adhesive 7 applied to an annular chamfer portion 83 illustrated in FIG. 16 enters into a seal gap 821, so that air inside the seal gap 821 is caused to travel to the space 25 through the increased-width gap portion 841 and the hole portion 236. This contributes to securely preventing air from remaining in the seal gap 821 as in the third preferred embodiment.

Also in the fourth preferred embodiment, the adhesive 7 is arranged in the seal gap 821 over an entire circumference thereof, and this contributes to preventing a leakage of a gas arranged inside a disk drive apparatus 1.

A method of manufacturing a spindle motor according to a preferred embodiment of the present invention preferably includes the steps of: press fitting a lower portion of a shaft into a through hole defined in a base portion; applying an adhesive to a seal gap which is defined on a lower side of a press-fitting region between the lower portion of the shaft and an inner circumferential portion of the base portion, and which is arranged to gradually decrease in radial width with increasing height; and curing the adhesive, which is arranged in the seal gap over an entire circumference thereof.

A method of manufacturing a spindle motor according to another preferred embodiment of the present invention preferably includes the steps of: applying an adhesive to an inner circumferential portion of a base portion including a through hole defined therein; press fitting a lower portion of a shaft into the through hole; and curing the adhesive, which is arranged at all circumferential positions in a seal gap which is defined on a lower side of a press-fitting region between the lower portion of the shaft and the inner circumferential portion of the base portion, and which is arranged to gradually decrease in radial width with increasing height.

A method of manufacturing a spindle motor according to yet another preferred embodiment of the present invention preferably includes the steps of: applying an adhesive to an inner circumferential portion of a base portion including a through hole defined therein; press fitting a lower portion of a shaft into the through hole; applying an additional adhesive to a recessed portion which is defined in the lower portion of the shaft or a lower end portion of an inner circumferential surface of the inner circumferential portion of the base portion, and which is arranged to be in connection with a seal gap defined on a lower side of a press-fitting region between the lower portion of the shaft and the inner circumferential portion of the base portion; and curing the adhesive, which is arranged in the seal gap over an entire circumference thereof.

Features of the above-described preferred embodiments and the modifications thereof may be combined appropriately as long as no conflict arises. While preferred embodiments of the present invention have been described above, it is to be understood that variations and modifications will be apparent to those skilled in the art without departing from the scope and spirit of the present invention. The scope of the present invention, therefore, is to be determined solely by the following claims.

For example, in a modification of the first preferred embodiment, the lower portion of the inserted outer circumferential surface 413 may be defined by an angled surface arranged to gradually decrease in diameter with increasing height, and a seal gap may be defined between the lower portion of the inserted outer circumferential surface 413 and the inner circumferential surface lower portion 232, which is defined by an angled surface. In a modification of the second preferred embodiment, a portion of the chamfer 831 of the shaft lower portion 412 may include a recessed portion that is recessed upward in the annular chamfer portion 83a. Also, both the shaft lower portion 412 and the inner circumferential portion 23 may be arranged to include such recessed portions.

In the third preferred embodiment described above, the increased-width gap portion 841 is preferably defined at the boundary between the press-fitting region 81 and the seal gap 821. Note, however, that this is not essential to the present invention. For example, in a modification of the third preferred embodiment, the increased-width gap portion may be defined, away from the aforementioned boundary in a portion of the seal gap 821 which is in the vicinity of the press-fitting region 81. That is, it may be so arranged that a portion of the seal gap 821 is arranged below the aforementioned boundary, the increased-width gap portion 841 is arranged below this portion of the seal gap 821, and the remaining portion of the seal gap 821 is arranged below the increased-width gap portion 841. The same holds true for the fourth preferred embodiment.

Also, the inserted outer circumferential surface 413 of the shaft lower portion 412 may be arranged to include an annular groove portion defined therein as the increased-width gap portion 841. The inserted outer circumferential surface 413 may be arranged to include a groove portion extending in the axial direction and defined therein as the communicating channel 842. A plurality of communicating channels 842 may be defined in the fixing region 8. In a modification of the fourth preferred embodiment, a plurality of hole portions 236 may be provided.

In a modification of the first preferred embodiment, the annular chamfer portion 83 may be provided with a recessed portion 833 as illustrated in FIG. 11. This contributes to more efficiently directing the adhesive 7 into the seal gap 821. Also, an increased-width gap portion 841 and a communicating channel 842 as illustrated in FIG. 14 may be defined between the shaft lower portion 412 and the inner circumferential portion 23. In a modification of the first preferred embodiment, all of the recessed portion 833, the increased-width gap portion 841, and the communicating channel 842 may be provided. Furthermore, a hole portion 236 as illustrated in FIG. 16 may be provided as a communicating channel. In a modification of the second preferred embodiment, an increased-width gap portion 841 and a communicating channel 842 may be defined between the shaft lower portion 412 and the inner circumferential portion 23. Also, a hole portion 236 may be provided as a communicating channel.

In a modification of each of the above-described preferred embodiments, the sealant may be arranged along all or only some of the circumferential positions between the screw 153 and both the screw hole portion 410 of the shaft 41 and the hole portion 142a of the second housing member 142, and/or along all circumferential positions between the upper portion of the hole portion 142a and the head portion 153a of the screw 153. This contributes to prevention of a leakage of the gas arranged inside the disk drive apparatus 1. Also, the sealant may not necessarily be an adhesive, but may be an annular resin member preferably made of rubber or the like, for example.

The adhesive 7 is applied to a portion of the annular chamfer portion 83 at step S14 in FIG. 6 in the first preferred embodiment described above. Note, however, that the adhesive 7 may be applied to a plurality of portions of the annular chamfer portion 83 or to all circumferential positions in the annular chamfer portion 83, as long as the air inside the seal gap 821 can be properly discharged.

Features of the above-described preferred embodiments and the modifications thereof may be combined appropriately as long as no conflict arises.

Preferred embodiments of the present invention are applicable to spindle motors for use in disk drive apparatuses, for example.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A spindle motor for use in a disk drive apparatus to drive a disk, the disk drive apparatus including a housing defining an interior space, the spindle motor comprising:
    a stationary portion including a shaft arranged to extend in an axial direction;
    a base portion arranged to define a portion of the housing, and including a through hole in which the shaft is inserted; and
    a rotating portion arranged to rotate about a central axis with respect to the stationary portion; wherein
    the base portion includes an inner circumferential portion arranged to define the through hole, the inner circumferential portion and a lower portion of the shaft defining a fixing region therebetween;
    the fixing region includes a press-fitting region and an adhesion region defined on a lower side of the press-fitting region and in which a seal gap is defined between the inner circumferential portion of the base portion and the lower portion of the shaft;
    the seal gap includes an adhesive arranged therein over an entire circumference thereof;
    an increased-width gap portion is defined at a boundary between the seal gap and the press-fitting region or in a portion of the seal gap which is in a vicinity of the press-fitting region, the increased-width gap portion having an increased radial width and extending over an entire circumference; and
    a communicating channel is defined within the base portion or between the lower portion of the shaft and the inner circumferential portion of the base portion to connect the increased-width gap portion with a space defined on an upper side of an upper surface of the base portion.

2. The spindle motor according to claim 1, wherein
    an inner circumferential surface of the inner circumferential portion of the base portion includes an inner circumferential surface upper portion and an inner circumferential surface lower portion;
    the base portion includes a first groove portion defined between the inner circumferential surface upper portion and the inner circumferential surface lower portion, the first groove portion being annular and extending in a circumferential direction; and
    the increased-width gap portion is defined between the first groove portion and an outer circumferential surface of the lower portion of the shaft.

3. The spindle motor according to claim 1, wherein a radial width of the communicating channel is greater than a radial width of the seal gap.

4. The spindle motor according to claim 1, wherein
    an inner circumferential surface of the inner circumferential portion of the base portion includes an inner circumferential surface upper portion and an inner circumferential surface lower portion;
    the base portion includes at least one second groove portion defined in the inner circumferential surface upper portion, each second groove portion extending in the axial direction; and
    the communicating channel is defined between each second groove portion and an outer circumferential surface of the lower portion of the shaft.

5. The spindle motor according to claim 1, wherein
    the base portion includes a hole portion arranged near the through hole, and arranged to extend from the upper surface of the base portion in the axial direction; and
    a portion of the increased-width gap portion is arranged to be in connection with a radially inner portion of an inside surface of the hole portion.

6. The spindle motor according to claim 1, wherein
    an annular chamfer portion is defined on a lower side of the adhesion region; and
    the annular chamfer portion is arranged to gradually increase in radial width with decreasing height.

7. The spindle motor according to claim 1, wherein an axial length of the adhesion region is substantially equal to an axial length of the press-fitting region.

8. The spindle motor according to claim 1, wherein an axial length of the adhesion region is in a range between about half an axial length of the press-fitting region and about twice the axial length of the press-fitting region.

9. A disk drive apparatus comprising:
    the spindle motor of claim 1 arranged to rotate a disk;
    an access portion arranged to perform at least one of reading and writing of information from or to the disk;
    a clamper arranged to clamp the disk to the spindle motor; and
    a housing arranged to contain the disk, the spindle motor, the access portion, and the clamper.

10. The disk drive apparatus according to claim 9, wherein an interior space of the housing is filled with one of helium gas, hydrogen gas, a mixture of helium gas and hydrogen gas, and a mixture of air and any one of helium gas, hydrogen gas, and a mixture of helium gas and hydrogen gas.

* * * * *